United States Patent
Kashyap et al.

(10) Patent No.: US 9,348,590 B1
(45) Date of Patent: May 24, 2016

(54) DIGITAL SIGNAL PROCESSOR PREFETCH BUFFER AND METHOD

(71) Applicant: VeriSilicon Holdings Co., Ltd., Plano, TX (US)

(72) Inventors: Asheesh Kashyap, Plano, TX (US); Tracy Nguyen, Lewisville, TX (US)

(73) Assignee: VERISILICON HOLDINGS CO., LTD., Plano, TX (US)

( * ) Notice: Subject to any disclaimer, the term of this patent is extended or adjusted under 35 U.S.C. 154(b) by 413 days.

(21) Appl. No.: 14/019,633

(22) Filed: Sep. 6, 2013

(51) Int. Cl.
*G06F 9/30* (2006.01)
*G06F 9/38* (2006.01)
*G06F 12/08* (2016.01)

(52) U.S. Cl.
CPC .......... *G06F 9/30047* (2013.01); *G06F 9/3802* (2013.01); *G06F 9/3814* (2013.01); *G06F 12/0862* (2013.01)

(58) Field of Classification Search
CPC ... G06F 9/30047; G06F 9/3802; G06F 9/383; G06F 9/3804; G06F 12/0862; G06F 9/3814
See application file for complete search history.

(56) References Cited

U.S. PATENT DOCUMENTS

| | | | | |
|---|---|---|---|---|
| 5,822,790 A * | 10/1998 | Mehrotra | ............ | G06F 9/3802 326/11 |
| 6,052,756 A * | 4/2000 | Barnaby | ............ | G06F 12/0215 711/105 |
| 6,219,760 B1 * | 4/2001 | McMinn | ............ | G06F 12/0862 711/118 |
| 7,113,945 B1 * | 9/2006 | Moreshet | ............ | G06F 3/0608 |
| 2003/0196044 A1 * | 10/2003 | Ramirez | ............ | G06F 9/3802 711/137 |
| 2006/0179174 A1 * | 8/2006 | Bockhaus | ............ | G06F 12/126 710/22 |
| 2006/0242394 A1 * | 10/2006 | Uchiyama | ............ | G06F 9/30145 712/241 |
| 2009/0259989 A1 * | 10/2009 | Cifuentes | ............ | G06F 11/3604 717/110 |

* cited by examiner

*Primary Examiner* — Farley Abad

(57) ABSTRACT

A prefetch buffer and prefetch method. In one embodiment, the prefetch buffer has a main buffer embodied as a direct-mapped cache, and the prefetch buffer includes: (1) an alias buffer associated with the main buffer and (2) a prefetch controller associated with the main buffer and the alias buffer and operable to cause the alias buffer to store potentially aliasing cachelines of a loop body instead of the main buffer.

19 Claims, 4 Drawing Sheets

DIGITAL SIGNAL PROCESSOR PREFETCH BUFFER AND METHOD

TECHNICAL FIELD

This application is directed, in general, to digital signal processors (DSPs) and, more specifically, to a DSP prefetch buffer and method.

BACKGROUND

Cores of higher-performance general-purpose processors and DSPs have an instruction fetch interface, or "front end," in which instructions are speculatively prefetched from memory and placed inside an instruction prefetch buffer (or simply a "prefetch buffer") internal to the core to await decoding. In general-purpose processors, the prefetch buffer is almost always implemented as a first-in first-out (FIFO) buffer in which newly fetched instructions are stored, or "pushed," into a head of the FIFO and later removed, or "popped," from a tail of the FIFO as they begin execution.

However, DSPs are often called upon to execute loops more than are general-purpose processors and therefore tend to be optimized for that purpose. (A loop is defined for purposes of this disclosure as a body of instructions that is executed multiple times, for example, to implement a digital filter.) As stated above, instructions are popped from a FIFO as they begin execution, which means the same instructions have to be fetched over and over again when executing a loop, which wastes power. For this reason, the prefetch buffer of a DSP is rarely if ever implemented as a FIFO.

A more energy efficient solution is to implement the prefetch buffer as a direct-mapped cache. In a direct-mapped cache, a set of contiguous instructions in memory (known as a cacheline) may only be placed in one of N possible locations in the cache. This cacheline remains resident in the cache until it is overwritten with another cacheline that maps or "aliases" to the same location as the resident cacheline.

A loop is said to be "small" when its body fits inside the prefetch buffer. When the loop body is larger than the prefetch buffer, cachelines need to be replaced during execution of the loop. For instance, if the prefetch buffer has eight lines, and the loop body requires 12 lines, four lines of the loop body need to be replaced for every iteration of the loop. When the loop body is more than twice the size of the prefetch buffer, the energy efficiency advantage inherent in the direct-mapped cache disappears, and it begins to function like a FIFO buffer. Repeated exchanging of cachelines is called "thrashing" and wastes power. For this reason, prefetch buffers are typically sized such that loops expected to be encountered in routine operation are small and therefore can be executed without replacing cachelines.

SUMMARY

One aspect provides a prefetch buffer. In one embodiment, the prefetch buffer has a main buffer embodied as a direct-mapped cache, and the prefetch buffer includes: (1) an alias buffer associated with the main buffer and (2) a prefetch controller associated with the main buffer and the alias buffer and operable to cause the alias buffer to store potentially aliasing cachelines of a loop body instead of the main buffer.

In another embodiment, the prefetch buffer includes: (1) a main buffer embodied as a direct-mapped cache, (2) an alias buffer associated with the main buffer, 3) a prefetch controller associated with the main buffer and the alias buffer and operable to cause the alias buffer to store potentially aliasing cachelines of a loop body instead of the main buffer, (4) a lock register associated with the prefetch controller and operable to store lock bits for the main buffer, a corresponding lock bit set when a cacheline is written into the main buffer and cleared when the cacheline has been read from the main buffer and (5) a protect register associated with the prefetch controller and operable to store cacheline protect bits for the main buffer, a corresponding protect bit set to protect a cacheline from being overwritten if the loop body is smaller than the main buffer, a corresponding lock bit set and a corresponding protect bit cleared when a cacheline is first written to the main buffer, the corresponding lock bit cleared when the cacheline is read.

Another aspect provides a prefetch method. In one embodiment, the prefetch method includes: (1) causing a main buffer embodied as a direct-mapped cache to store cachelines of a loop body unless the cachelines are potentially aliasing cachelines and (2) causing an alias buffer to store the potentially aliasing cachelines.

BRIEF DESCRIPTION

Reference is now made to the following descriptions taken in conjunction with the accompanying drawings, in which.

DETAILED DESCRIPTION

It is realized herein that, although prefetch buffers may be sized such that most loops expected during routine operation are small and therefore can be executed without replacing cachelines, subtle issues remain with a conventional direct-mapped cache prefetch buffer implementation.

Figure 1:
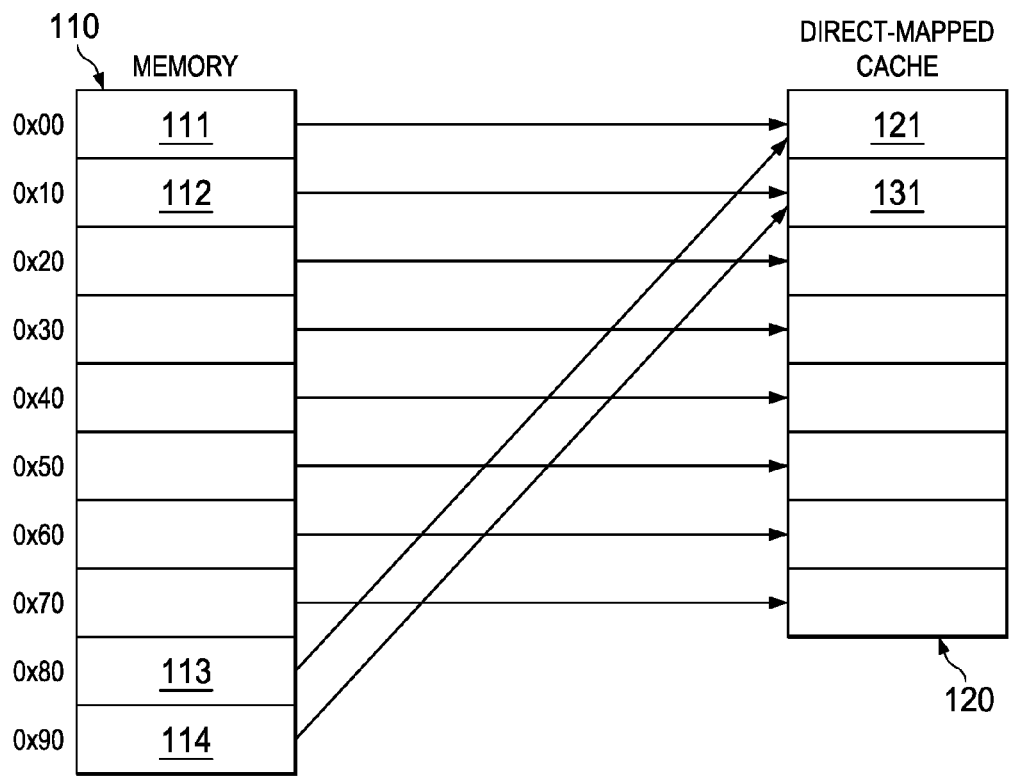
FIG. 1 illustrates an example in which a small loop is fetched into a direct-mapped cache prefetch buffer, resulting in cacheline aliasing.

First, it is realized herein that small loops should execute in signal processing applications without additional delay. This objective is called "zero overhead." It is also realized herein that a problem can arise in a direct-mapped prefetch buffer implementation in which the "start-of-loop" cacheline and the "end-of-loop" cacheline alias inside the buffer. FIG. 1 illustrates an example of cacheline aliasing. In FIG. 1, start-of-loop ranges 0x00 111 and 0x10 112 of a memory 110 respectively correspond to cachelines 121, 131 of a cache 120. Later, updating calls for end-of-loop ranges 0x80 113 and 0x90 114 of the memory 110 respectively to correspond to the cachelines 121, 131, which would give rise to aliasing. Some caches do not allow simultaneous reading and writing of a given cacheline. As a result, a condition called "starvation" occurs in which the cache is not available to load the pipeline, causing "bubbles" to appear in the pipeline. This violates the zero-overhead objective. The problem is further complicated by the fact that a group of instructions that is being read may actually span two cachelines. To eliminate the starvation in a direct-mapped cache, the cache must be able to support two reads and two writes to the same cachelines in the same cycle. This requires a relatively large, slow and non-standard direct-mapped cache implementation. Alternatively, the prefetch buffer may be implemented as a set-associative cache. However, the set-associative cache architecture has several significant disadvantages unrelated to the zero-overhead objective.

Second, it is realized herein that small loops should execute in a deterministic amount of time so the signal processing they carry out is predictable. This objective is called "deterministic." It is also realized herein that a problem can arise in a direct-mapped prefetch buffer implementation that the alignment of the loop body in memory can affect whether or not aliasing occurs if the loop body is approximately the same size as the prefetch buffer. Consequently, if a developer makes a change to the software that includes the loop, the loop may take varying numbers of cycles to execute depending on how its alignment changes within a cacheline. This violates the deterministic objective.

Figure 2:
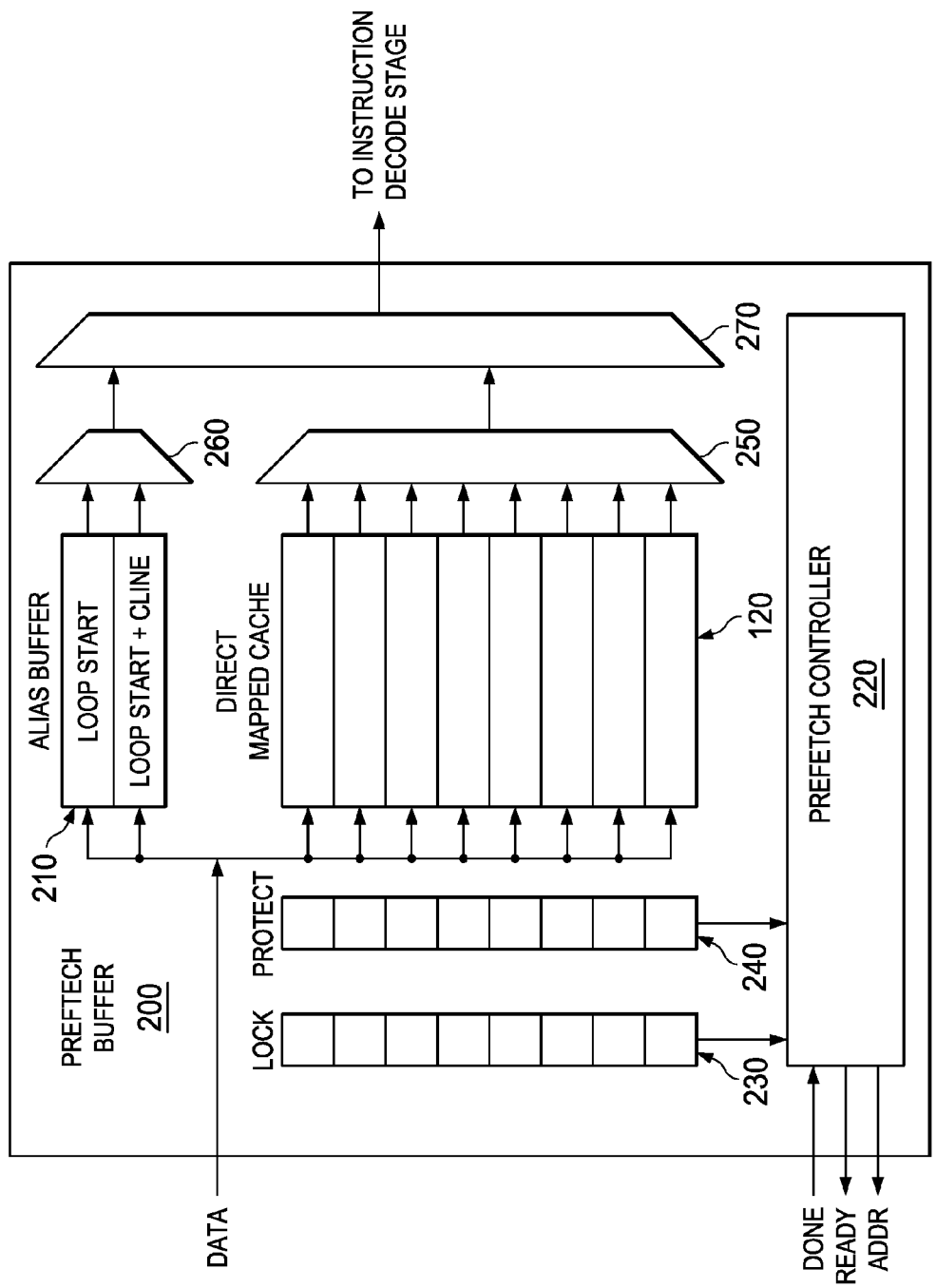
FIG. 2 is a block diagram of one embodiment of a prefetch buffer, including a prefetch controller, constructed according to the principles of the invention.

Introduced herein are various embodiments of a DSP prefetch buffer and method. Certain embodiments of the buffer and method embodiments meet the zero-overhead and deterministic objectives described above. Certain other embodiments are also energy efficient in that they reduce activity between the memory and the prefetch buffer FIG. 2 is a block diagram of one embodiment of a prefetch buffer 200 constructed according to the principles of the invention. The prefetch buffer 200 includes a main buffer 120 embodied as a direct-mapped cache, an alias buffer 210, a prefetch controller 220, a lock register 230, a protect register 240 and multiplexers 250, 260, 270.

Under control of the prefetch controller 220, instructions ("data") are fetched into the prefetch buffer 200 from a memory, which is not shown in FIG. 2 for simplicity's sake, but is shown in FIG. 1 as the memory 110. The instructions are provided to the main buffer 120 and to the alias buffer 210 as described below. The instructions (data) contained in the main buffer 120 and the alias buffer 210 are selected by the multiplexers 250, 260, 270 in response to a value contained in a program counter as described below and provided to a subsequent pipeline stage of a DSP (not shown). In the illustrated embodiment, the subsequent pipeline stage is an instruction decode stage.

In the illustrated embodiment, the DSP contains a plurality of subsequent stages. Those skilled in the pertinent art understand pipelined DSP architectures in general and further that the prefetch buffer 200 may be employed with a wide variety of conventional or later-developed DSP architectures.

As stated above, the main buffer 120 is embodied as a direct-mapped cache. For purposes of this disclosure, a direct-mapped cache is defined as a cache in which the cache location for a given address is determined from its n+m least-significant address bits, wherein the cache has $2^n$ cachelines that are each $2^m$ bits long. The least-significant m address bits correspond to an offset within a cache entry, and the next n address bits give the cache location. The remaining most-significant address bits are stored as a tag along with the cacheline.

The lock register 230 is operable to store a lock bit for each entry in the main buffer 120. The lock bit is set when the cacheline is first written into the main buffer 120 and cleared when the cacheline has been read. When the lock bit is set, the corresponding cacheline cannot be overwritten. However, any cacheline(s) that are currently being read by the program counter are automatically protected (i.e. cannot be overwritten). Note that during a major control flow event, such as a prefetch buffer 200 "miss," mispredict or interrupt, all of the lock bits in the lock register 230 are cleared, opening the main buffer for a complete refresh.

The protect register 240 is operable to store a cacheline protect bit for each entry in the main buffer 120. The protect bit protects a cacheline from being overwritten if the loop body is smaller than the prefetch buffer 200. When a cacheline is first written to the main buffer 120, its corresponding lock bit is set, and its protect bit is cleared. When the cacheline is read, the lock bit is automatically cleared.

However, if the following two conditions are met, the protect bit is set, which ensures that the cacheline will not be overwritten. The first condition is that the cacheline being read is part of a loop body that fits within the prefetch buffer 200. In the illustrated embodiment, this test is performed by bounds checking on the start and end addresses of an active loop body. The second condition is that the loop counter is not on its last iteration. As those skilled in the pertinent art are aware, DSPs have specialized loop count registers to implement "for loops" efficiently. If the loop counter is not on its last iteration, the loop instructions will be reused, and the cacheline should remain protected. If the loop counter is on its last iteration, the corresponding protect bit is cleared, allowing new instructions to be written to this buffer entry.

The alias buffer 210 accommodates loops that are larger than the size of the main buffer 120. In the illustrated embodiment, the alias buffer 210 has two additional cachelines that store the loop start cacheline (located at a "loop start" address), and the next sequential cacheline in memory after the loop start cacheline (located at a "loop start+cline" address).

The prefetch controller 220 is operable to set and reset bits in the lock and protect registers 230, 240 as described above and generate address requests and a ready signal to the memory based on the contents of the lock and protect registers 230 and a done signal received from the memory. The prefetch controller 220 is further operable to control the multiplexers 250, 260, 270 in response to signals received from a pipeline control unit (not shown, but which may be conventional in structure and function).

Figure 3:
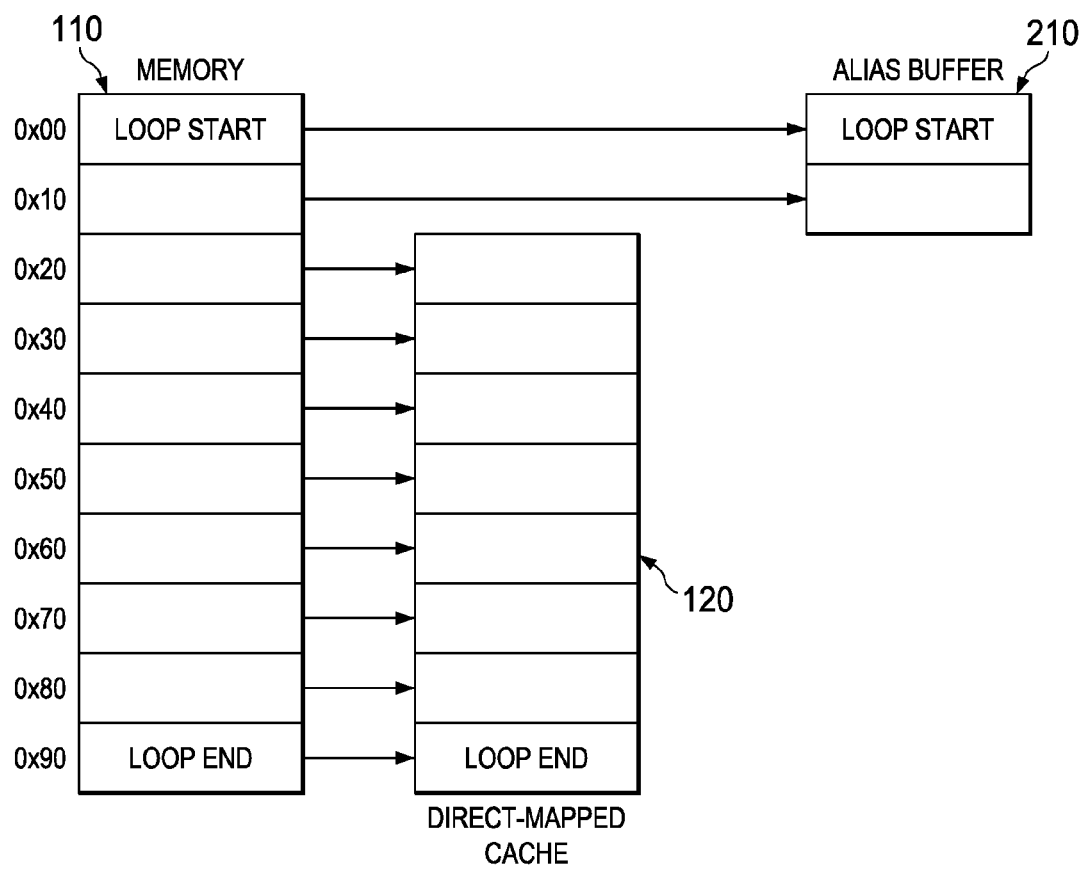
FIG. 3 illustrates an example in which a small loop is fetched into a prefetch buffer constructed according to the principles of the invention, cacheline aliasing being avoided.

FIG. 3 illustrates an example in which a small loop is fetched into a prefetch buffer constructed according to the principles of the invention. The primary function of the alias buffer 210 in various embodiments is to store potentially aliasing cachelines. In the illustrated embodiment, the alias buffer 210 is operable to store the loop start cacheline and the next sequential cacheline in memory in the alias buffer 210, as shown in FIG. 3. Hence, the loop start address does not alias to the loop end address, because loop start and loop end instructions are kept in different buffers.

As stated above, a set associative cache (e.g., a two-way set associative cache) may be used to avoid aliasing. However, associative caches have two significant disadvantages. First, they consume more power, because while data is always read from two "ways," only data from one way is used. Second, set associative caches consume more area ("real estate"), because they require a larger, more complicated multiplexing structure.

The ready and done signals allow the prefetch buffer 200 of FIG. 2 to have a stallable instruction fetch interface. Instructions may be speculatively prefetched from memory or cache, but will only be allowed to update the prefetch buffer 200 when the ready signal is asserted. When the ready signal is deasserted, the incoming cacheline cannot be written into the prefetch buffer 200. Instead, the data is held until the ready signal is again asserted. The ready signal remains deasserted under the following conditions:

1. The cacheline is locked (its lock bit is set),
2. The cacheline is protected (its protect bit is set), or
3. The cacheline is currently being read.

Making the instruction fetch interface stallable allows instructions that may in the future be needed to be prefetched without having to expel instructions from the prefetch buffer 200 are currently being used. A stallable interface is especially useful for prefetching "fall-through" instructions, namely instructions executed after exiting the loop body. On the last iteration of the loop, the protect bits are cleared, allowing the fall-through instructions to update the cache. Consequently, (stall cycles) when exiting the loop body are avoided, because the fall-through instructions are already in the prefetch buffer 200.

Figure 4:
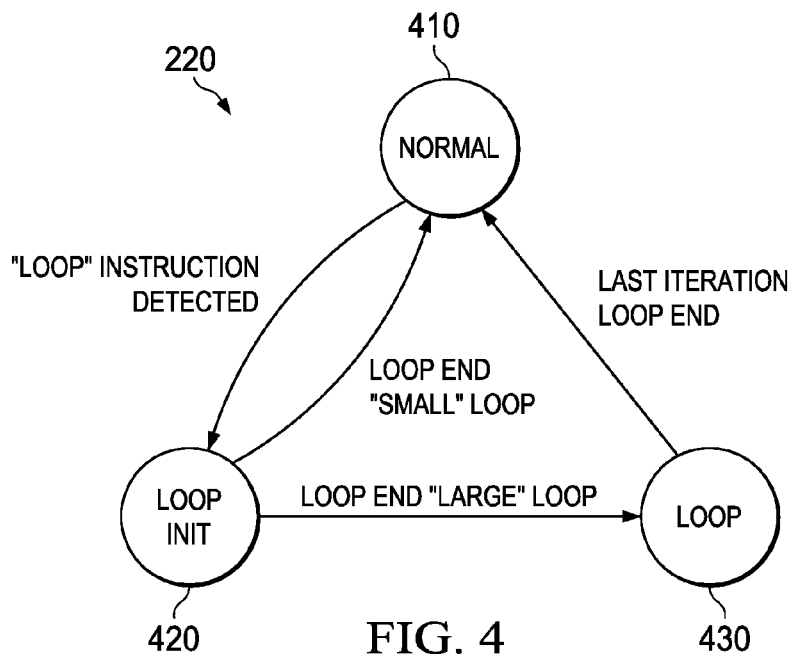
FIG. 4 is a diagram of one embodiment of a prefetch controller state machine for the prefetch controller of FIG. 2.

FIG. 4 is a diagram of one embodiment of a state machine for the prefetch controller 220 of FIG. 2. In the illustrated embodiment, the prefetch controller 220 takes the form of a state machine that changes prefetching behavior when a "loop" instruction is encountered. The illustrated state machine has at least three states: a NORMAL state 410, a LOOP_INIT state 420 and a LOOP state 430.

When the prefetch controller 220 is in the NORMAL state 410, it prefetches instructions according to branch prediction rules and tries to stay ahead of the decode stream. Most DSPs have one or more "loop" instructions that indicate loop boundaries and also number of iterations. When the prefetch controller 220 detects one of these instructions in an incoming cacheline, it transitions to the LOOP_INIT state 420.

In the LOOP_INIT state 420, the prefetch controller 220 fetches up until the end of the loop body. In the illustrated embodiment, the prefetch controller 220 writes the first iteration of the loop body into the main buffer 120 of FIG. 1. Once the prefetch controller 220 reaches the end of the loop body, it calculates whether the loop body fits inside the main buffer 120 (a "small" loop), or does not inside the main buffer 120 (a "large" loop). If a small loop is detected, the prefetch controller 220 transitions back to the NORMAL state 410, and the loop body is protected by the loop protect bits. However, if a large loop is detected, the prefetch controller 220 transitions to the LOOP state 430.

Upon entering the LOOP state 430, the prefetch controller 220 fetches the loop start cacheline and the next sequential cacheline and places these cachelines in the alias buffer 210 of FIG. 2. All other cachelines of the loop body are placed in the main buffer 120 of FIG. 2. After fetching the loop end cacheline on the final iteration of the loop, the prefetch controller 220 returns to the NORMAL state 410 and starts fetching the fall-through path. Loop protect bits need not be used for large loops, because the loop counter value can be employed as a synchronization point between the program counter and the prefetch controller 220. The fall-through instructions are not fetched until the last iteration of the loop is reached. The fall-through instructions are, by definition, the sequential cachelines after the loop end cacheline. The program counter prevents the fall-through cachelines from overwriting the loop body cachelines by protecting cachelines that are currently being used. Hence, a fall-through cacheline is updated into the main buffer 120 of FIG. 2 only after the program counter has released the cacheline.

The prefetch buffer embodiments described above may be extended to nested loops to result in still further embodiments. Consider the following cases of two nested loops: loop0 and loop1, where loop0 is nested inside loop1.

If loop0 and loop1 are both smaller than the main buffer 120, they are protected by the loop protect mechanism, and execute with zero-overhead in a deterministic amount of time.

If loop0 is smaller than the main buffer 120, but loop1 is larger than the main buffer 120, loop0 is protected by the loop protect mechanism. On the final iteration of loop1, the program counter protects the remainder of the body of loop1 (that part of loop1 that does not contain loop0).

If both loop0 and loop1 are larger than the main buffer 120, loop0 gets priority to use the alias buffer 210, since, being the inner loop, it execute more often than the outer loop. For instance, if loop1 executes for three iterations, and loop0 executes for two iterations, the inner loop executes six (3×2) times in total, but the outer loop only executes three times.

Figure 5:
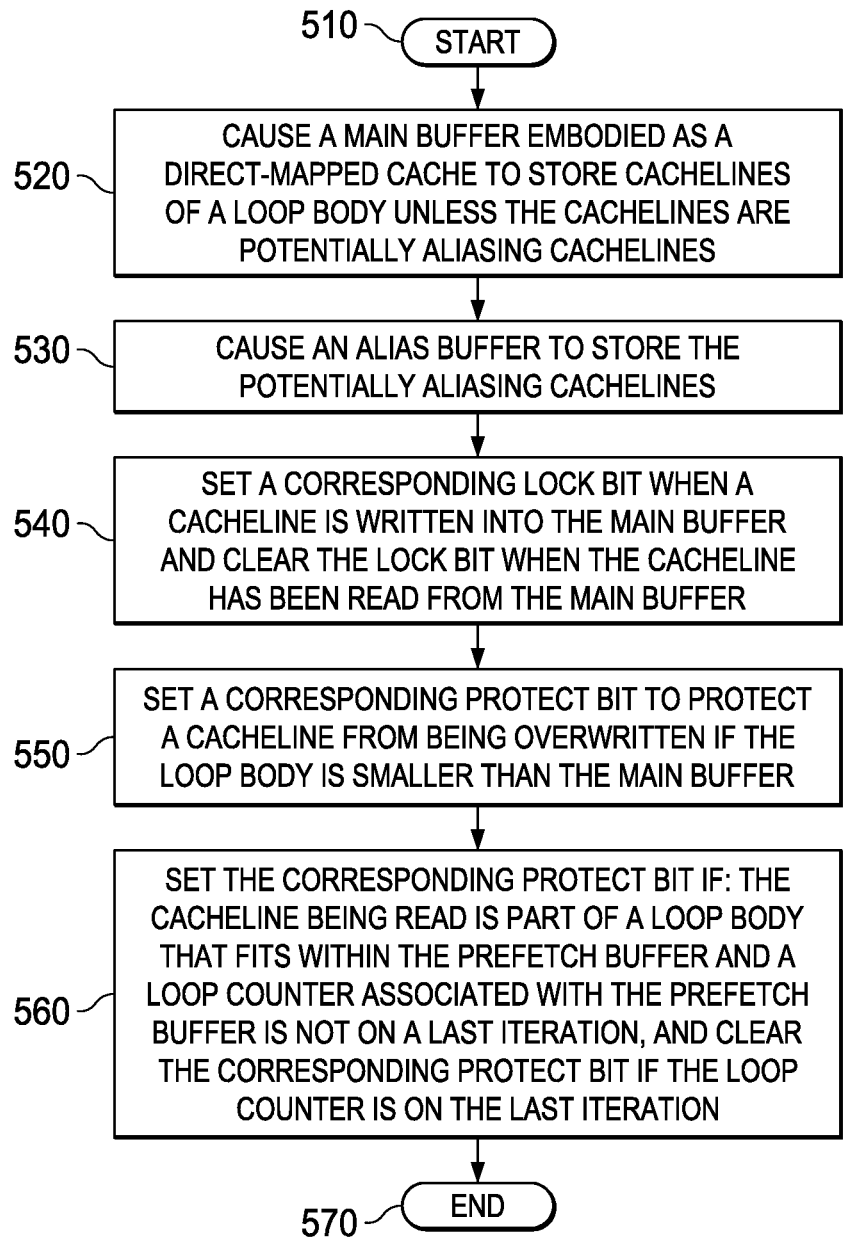
FIG. 5 is a flow diagram of one embodiment of a DSP prefetch method carried out according to the principles of the invention.

FIG. 5 is a flow diagram of one embodiment of a DSP prefetch method for a prefetch buffer carried out according to the principles of the invention. The method begins in a start step 510. In a step 520, a main buffer embodied as a direct-mapped cache is caused to store cachelines of a loop body unless the cachelines are potentially aliasing cachelines. In a step 530, an alias buffer is caused to store the potentially aliasing cachelines. In a step 540, set a corresponding lock bit is set when a cacheline is written into the main buffer and cleared bit when the cacheline has been read from the main buffer. In a step 550, a corresponding protect bit is set to protect a cacheline from being overwritten if the loop body is smaller than the main buffer. In a step 560, the corresponding protect bit is set if the cacheline being read is part of a loop body that fits within the prefetch buffer and a loop counter associated with the prefetch buffer is not on a last iteration. The corresponding protect bit is cleared if the loop counter is on the last iteration. The method ends in an end step 570.

Those skilled in the art to which this application relates will appreciate that other and further additions, deletions, substitutions and modifications may be made to the described embodiments.

What is claimed is:

1. A prefetch buffer having a main buffer embodied as a direct-mapped cache, said prefetch buffer comprising:
    an alias buffer associated with said main buffer;
    a prefetch controller associated with said main buffer and said alias buffer and operable to cause said alias buffer to store potentially aliasing cachelines of a loop body instead of said main buffer; and
    a protect register associated with said prefetch controller and operable to store cacheline protect bits for said main buffer, a corresponding protect bit set to protect a cacheline from being overwritten if said loop body is smaller than said main buffer.

2. The prefetch buffer as recited in claim 1 further comprising a lock register associated with said prefetch controller and operable to store lock bits for said main buffer, a corresponding lock bit set when a cacheline is written into said main buffer and cleared when said cacheline has been read from said main buffer.

3. The prefetch buffer as recited in claim 1 wherein a corresponding lock bit is set and a corresponding protect bit is cleared when a cacheline is first written to said main buffer and wherein said corresponding lock bit is cleared when said cacheline is read.

4. The prefetch buffer as recited in claim 3 wherein said corresponding protect bit is set if:
    said cacheline being read is part of a loop body that fits within said prefetch buffer; and
    a loop counter associated with said prefetch buffer is not on a last iteration, and wherein said corresponding protect bit is cleared if said loop counter is on said last iteration.

5. The prefetch buffer as recited in claim 1 wherein said prefetch controller is operable to perform bounds checking to determine if said cacheline being read is part of said loop body.

6. The prefetch buffer as recited in claim 1 wherein ready and done signals allow said prefetch buffer to have a stallable instruction fetch interface.

7. The prefetch buffer as recited in claim 1 wherein said prefetch controller is embodied in a state machine having at least:
  a NORMAL state,
  a LOOP_INIT state, and
  a LOOP state.

8. A prefetch method for a prefetch buffer, comprising:
  causing a main buffer embodied as a direct-mapped cache to store cachelines of a loop body unless said cachelines are potentially aliasing cachelines;
  causing an alias buffer to store said potentially aliasing cachelines; and
  setting a corresponding protect bit to protect a cacheline from being overwritten if said loop body is smaller than said main buffer.

9. The prefetch method as recited in claim 8 further comprising:
  setting a corresponding lock bit when a cacheline is written into said main buffer; and
  clearing said lock bit when said cacheline has been read from said main buffer.

10. The prefetch method as recited in claim 8 further corresponding:
  setting a corresponding lock bit and clearing a corresponding protect bit when a cacheline is first written to said main buffer; and
  clearing said corresponding lock bit when said cacheline is read.

11. The prefetch method as recited in claim 10 further comprising:
  setting said corresponding protect bit if:
    said cacheline being read is part of a loop body that fits within said prefetch buffer, and
    a loop counter associated with said prefetch buffer is not on a last iteration; and
  clearing said corresponding protect bit if said loop counter is on said last iteration.

12. The prefetch method as recited in claim 8 further comprising performing bounds checking to determine if said cacheline being read is part of said loop body.

13. The prefetch method as recited in claim 8 wherein ready and done signals allow said prefetch buffer to have a stallable instruction fetch interface.

14. The prefetch method as recited in claim 8 wherein said prefetch controller is embodied in a state machine having at least:
  a NORMAL state,
  a LOOP_INIT state, and
  a LOOP state.

15. A prefetch buffer, comprising:
  a main buffer embodied as a direct-mapped cache;
  an alias buffer associated with said main buffer;
  a prefetch controller associated with said main buffer and said alias buffer and operable to cause said alias buffer to store potentially aliasing cachelines of a loop body instead of said main buffer;
  a lock register associated with said prefetch controller and operable to store lock bits for said main buffer, a corresponding lock bit set when a cacheline is written into said main buffer and cleared when said cacheline has been read from said main buffer; and
  a protect register associated with said prefetch controller and operable to store cacheline protect bits for said main buffer, a corresponding protect bit set to protect a cacheline from being overwritten if said loop body is smaller than said main buffer, a corresponding lock bit set and a corresponding protect bit cleared when a cacheline is first written to said main buffer, said corresponding lock bit cleared when said cacheline is read.

16. The prefetch buffer as recited in claim 15 wherein said corresponding protect bit is set if:
  said cacheline being read is part of a loop body that fits within said prefetch buffer; and
  a loop counter associated with said prefetch buffer is not on a last iteration, and wherein said corresponding protect bit is cleared if said loop counter is on said last iteration.

17. The prefetch buffer as recited in claim 15 wherein said prefetch controller is operable to perform bounds checking to determine if said cacheline being read is part of said loop body.

18. The prefetch buffer as recited in claim 15 wherein ready and done signals allow said prefetch buffer to have a stallable instruction fetch interface.

19. The prefetch buffer as recited in claim 15 wherein said prefetch controller is embodied in a state machine having at least:
  a NORMAL state,
  a LOOP_INIT state, and
  a LOOP state.

* * * * *